Figure 1:
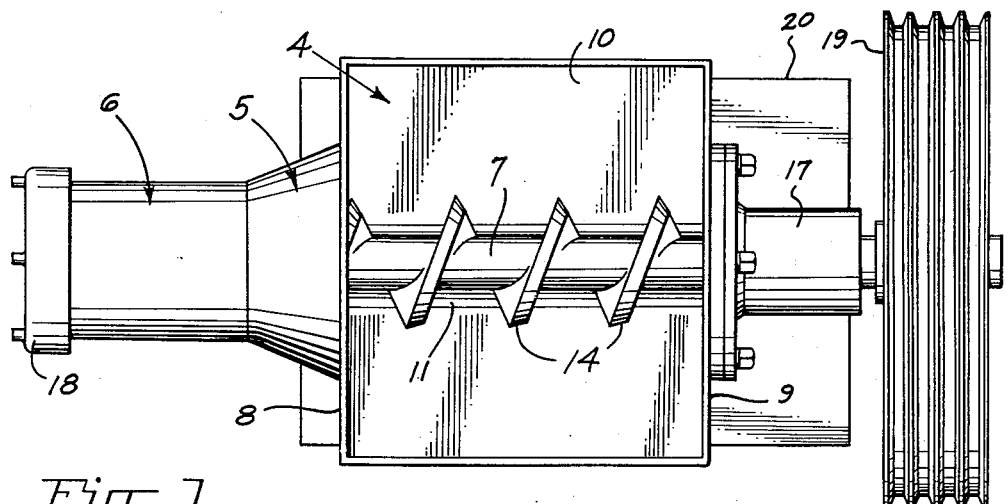

INVENTOR.
Paul Autio
BY
Atty.

United States Patent Office 2,796,901
Patented June 25, 1957

2,796,901

GRINDER FOR FROZEN MATERIALS

Paul Autio, Astoria, Oreg.

Application December 21, 1954, Serial No. 476,758

4 Claims. (Cl. 146—184)

This invention relates to a heavy duty, worm type grinder of large capacity and exceptional strength of construction particularly adapted to grind food or other material which is partially or fully frozen in order to eliminate the necessity for thawing the material prior to grinding.

One object of my invention is to provide a heavy duty grinder with a tapered self-forcing throat and with a spiral feed worm having a blade which is beveled to a knife edge in order cooperatively to cut and to feed through the grinder large masses of partially or fully frozen materials.

While the grinder of the instant invention is useful in grinding a variety of materials which heretofore have been considered extremely difficult or impossible to grind, it is of particular utility to the commercial fur farmer in grinding large quantities of partially or wholly frozen feed for his fur bearing animals. Accordingly, and to lend an appreciation of the advantages afforded by the novel features of the invention, an understanding of the problems met by such a commercial fur farmer is necessary. Such an explanation further will make evident why I have turned my inventive efforts to the grinder field.

A successful commercial fur farmer is required to raise large numbers of fur bearing animals in order to reduce the unit cost of feeding, housing and otherwise caring for the animals and thus to realize a profit. At the same time, the average farmer does a major share of the work himself else the labor costs will cut down his profit. Because of the large number of animals which must be fed and cared for, it is common for the commercial raiser of mink and fox to utilize frozen fish and meats as feed. Frozen feed presents no storage problem with modern refrigeration and the preparation time is less once the feed has been thawed. As will be apparent, the thawing time consumed by frozen or partially frozen feed does present a problem, however. The small animals must be fed ground fish or meat and, heretofore, no grinder has been available which will grind fully or partially frozen blocks of these foods. It is the grinding of such feed which has presented the problem solved by the instant invention.

To the above ends, it will be appreciated that a conventional food grinder cannot successfully grind a large partially or fully frozen block of food since the hardness of the block will not allow the worm to take hold. Some farmers have solved this problem by first cutting or chopping the feed with an ax in order to provide the worm with smaller pieces. A conventional type of worm employed in a food grinder is provided with a spiral blade. The peripheral edges of such a blade are flat and plane so as to fit tightly within the barrel of the grinder. When a large frozen or partially frozen block or chunk of food is fed to such a flat faced worm, it is not fed to the barrel. Instead, the food rides on the blades and the flat blades merely hold the food away from entry into the barrel. For example, it is not unusual for a fur farmer to use a sixty pound piece of frozen meat. When such a piece is presented to a conventional worm, it merely rests upon the flat edges of the spiral blade either until the meat is partially thawed or until small pieces are broken off by the revolving worm. In either event, needless time is consumed. It is for this reason that the commercial fur farmer heretofore has been required to thaw all of his frozen feed before grinding it for consumption by the animals. This requires time and forces the farmer to handle wet, slippery pieces of feed whereas he would rather grind a frozen piece. It thus is one object of my invention to provide a grinder which efficiently and quickly will grind frozen food without requiring the preliminary step of thawing, chopping, or cutting, as heretofore has been the practice.

A further object of my invention is to provide a heavy duty grinder with a self-feeding or a self-forcing type throat intermediate the hopper and barrel whereby large pieces, chunks and blocks of frozen or partially frozen food presented to the worm from the hopper of the grinder will be forced downwardly into engagement with the worm and forwardly into the barrel where the actual grinding operation takes place.

A further object of my invention is to construct a grinder with a heavy duty steel casting which defines the receiving hopper, feed throat, and barrel elements of a worm-type grinder, said elements being joined as an integral unit so as to resist wear and so as to stand up under the heavy duty grinding required in the preparation of frozen or partially frozen food.

Another object of my invention is to provide the worm of a heavy duty grinder with a composite spiral blade having a peripherally beveled knife edge on that portion of the spiral blade which traverses the hopper and having a flat and a plane peripheral blade on that portion which traverses the barrel, thereby allowing large chunks of food, both frozen and unfrozen, to be cut and gripped and to be advanced from the hopper through the barrel by the blade.

The above and other objects and advantages of my invention will be set forth in the following detailed description, taken in conjunction with the accompanying drawings, wherein:

Fig. 1 is a top view of the heavy duty grinder with the pulley belts removed from the heavy pulley wheel.

Figure 2:
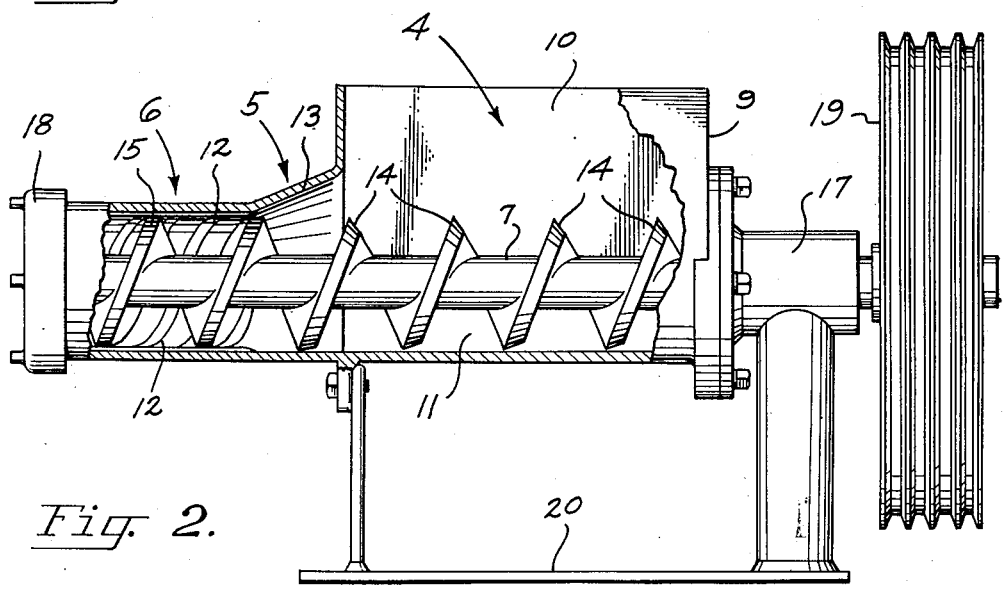
Figure 3:
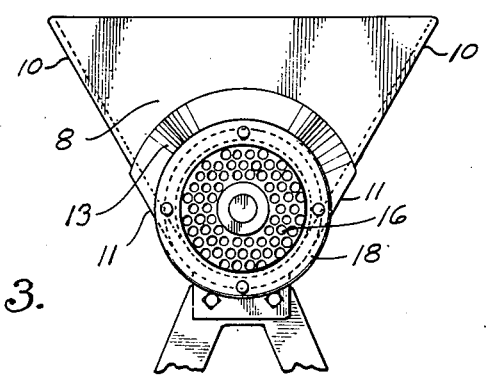

Fig. 2 is a side view, partially broken away, showing the bevel or knife edge periphery of the spiral blade and the taper of the throat intermediate the hopper and the barrel; and Fig. 3 is an end view illustrating the manner in which the tapered throat is bounded by sharply converging lower side walls on the hopper and by the curved bottom portion of the casting, respectively, in order to force the advancing food inwardly toward the worm.

It is a primary requisite of my invention that the grinder be of exceptionally large capacity (larger even than a hotel size grinder) and of sturdy construction in order to serve the needs of the commercial fur farmer and others who must grind large quantities of tough, brittle or hard materials such as frozen fish and meat. To this end, the receiving hopper element 4, the feed throat element 5, and the barrel element 6 of the grinder are made integral by forming an elongated, hollow, heavy duty steel casting which I term a body member. The bottom portion of this cast body member (see Figs. 2 and 3) is formed on a uniform circular curvature which closely bounds the periphery of a worm element 7. It is the function of the worm 7, in cooperation with the elements of the casting, to advance the food or other material through the grinder from right to left in Figs. 1 and 2.

In detail, the hopper 4 is provided with an exceptionally large open top which is bounded by a vertical front wall 8, a vertical rear wall 9, and sloping side walls 10. The sloping side walls 10, in turn, merge in sharply converging lower side walls 11 which are joined to the curved bottom portion of the casting as shown in Fig. 3. These various elements of the hopper are of particular cooperative aid in feeding large chunks of food against and toward the worm 7 where that worm underlies the hopper.

The previously mentioned barrel 6 is of a hollow, cylindrical configuration having the same radius as the curved bottom portion of the casting previously mentioned. Interiorly, the barrel is provided with upstanding spiral rifling 12 having a flat face formed thereon for cooperation with the worm 7 as hereinafter will be described.

The feed throat 5 merges and is joined with both the front wall 8 of the hopper and the barrel 6. In addition, the upper portion of this throat 13 is tapered on a curved sweep in the direction of advance of the worm in order to define a rounded and a converging funnel shape. Such a funnel shape is self-forcing in principle since material which is advanced into the tapered tunnel is crowded against the worm 7 as it passes through and under the curved portion 13. As will be evident from Fig. 3, the sides and the lower portion of the hollow throat 5 also are self-feeding in arrangement since they are bounded by the sharply converging lower side walls 11 and the curved bottom portion of the casting, respectively. Thus, material which enters the throat either from the top or the sides is forced into convergence with the worm 7 at the same time as it is advanced into the barrel 6.

The specific details of the worm 7 are best illustrated in Fig. 2. As therein shown, the worm is provided with an upstanding spiral blade which extends the full length of the casting in order to advance the food through the grinder. That portion of this spiral blade which traverses the hopper is peripherally beveled to a knife edge 14, and that portion which traverses the barrel 6 is flat and plane, as indicated at 15, about the periphery. The transition from knife edge to flat periphery takes place within the tapered throat 5 either at one end thereof or adjacent the middle.

In function, the knife edge portion 14 cuts and thus grabs or grips the food within the hopper even though this food may be frozen. This cutting and gripping are with a positive action in order to advance the food toward and into the tapered throat 5. The flat or plane portion 15, on the other hand, closely fits within and cooperates with the spiral rifling 12 within the barrel in order to continue the advance, prevent leakage and grind the food.

As will be evident, the knife edge 14 may require sharpening upon occasion during the life of the grinder. Such a sharpening easily is accomplished and the efficient functioning of the grinder is not impaired by the resultant decrease in overall diameter as the grinding wears down the worm. This is so, since that portion of the worm which underlies the hopper need not fit as tightly or as closely with the surrounding portions of the casting as does that portion of the spiral blade which must coact with the rifling within the barrel. In practice, the worm 7 and the spiral blade are formed as an integral heavy steel casting so as to resist wear and stand up under the heavy duty requirements.

Referring now to additional details of the grinder, the elongated worm 7 is journalled at one end in the center of a perforated plate 16 and, at the opposite end, in a housed journal bearing 17. The plate 16 is secured in place by means of a threaded retainer ring 18 and the ground food or other material is forced through the perforations as will be apparent. In order to rotate the worm 7, a massive pulley wheel 19 is keyed to the protruding end of the worm shaft outboard of the journal bearings 17. A 10 horsepower or larger electric motor is used to drive a plurality of belts joined to this pulley wheel during operation. As the size of the pulley wheel and electric motor will indicate, the worm must continue to rotate even against considerable forces encountered in grinding large masses of frozen food or the like. I thus have incorporated substantial mass in the pulley wheel so as to define a flywheel type rotation mechanism capable of maintaining substantial rotational inertia during operation. This feature is in service to the heavy duty operating conditions under which the grinder will operate efficiently where other grinders have failed.

In use, the entire grinder mechanism should be mounted upon a sturdy base 20 or other similar support. Again referring to the commercial fur farmer as an exemplary user of the grinder, the hopper 4 is of sufficient size to receive at least a sixty pound chunk or block of partially or fully frozen fish, meat, or other food. Fish and/or meat feed must be ground before it is fed to the mink or fox, yet the farmer can save time and bother if he need not thaw the feed before grinding it. The entire block of feed is lifted into the hopper 4 and the worm 7 then is rotated by the electric motor and the connecting pulley wheel structure 19.

As is most evident in Fig. 2, the frozen or partially frozen chunk of feed will be guided toward the worm 7 by the sloping side walls of the hopper 4. Once in contact with the worm, the mass of the feed itself will move the feed into abutment and against the knife edges 14 causing the sharp configuration thereof to bite into the frozen surface and obtain a positive type grab or grip. As the worm 7 continues to rotate, the beveled knife edge portion 14 feeds the large block of food toward the tapered throat 5 at the same time that it tears, breaks, cuts and slices off pieces of the feed with a positive, knife-like action. This action of the worm will make evident the reason I prefer to cast a steel worm of exceptional strength.

As the pieces, slices and chunks of frozen food are advanced by the worm, they next are presented to the tapered throat 5 where the funnel shape thereof causes the mass to converge toward the worm. The advancing particles of food then are crowded and are forced inwardly toward the worm at the same time as they are advanced forwardly. It thus is the cooperative function of the tapered throat and worm to move the mass into the barrel 6 for passage through the apertures in the plate 16. This entire grinding operation is accomplished without thawing and thus is of substantial importance in saving time and labor costs for the commercial fur farmer.

In summary, it will be appreciated that the various elements of my grinder must be of substantial strength in order to grind partially or completely frozen food. To this end, the following dimensions are exemplary of one model I have found practical and am selling: The open top of the hopper 4 measures 21 inches by 30 inches, the large end of the tapered throat opening is 21 inches by 14 inches, the worm 7 is 36 inches in length, and the plate 16 is 8½ inches in diameter. These dimensions, in combination with the above mentioned features of my invention, provide a heavy duty grinder which will prepare frozen meat, fish, and the like in large quantities at a speed heretofore unattained in a grinding operation.

I claim:

1. A heavy duty grinder for preparing frozen meat, fish and the like, comprising an elongated hollow heavy duty steel casting defining in one integral piece the heavy duty receiving hopper, feed throat and barrel elements of a worm type grinder, an elongated cast steel worm mounted for rotation within and extending the full length of said hollow casting through the lower portions of said hopper and throat and through said barrel, the bottom portion of said casting beneath the length of said worm being curved closely about the periphery of the worm for cooperation therewith in advancing material through the grinder, said hopper having an open top of large capacity bounded by vertical front and rear walls and by sloping side walls, the sloping side walls of said hopper merging in sharply converging lower side walls joined to the curved bottom portion of said casting, said barrel being of a hollow cylindrical configuration having the same radius as the curved bottom portion of said casting and closely bounding the periphery of said worm, an apertured plate means detachably mounted across the open end of said barrel to journal one end of said elongated worm, said feed throat being hollow and the upper portion thereof being tapered on a curved sweep in the direction of advance of said worm to define a rounded converging funnel shape which is self-forcing in feed intermediate the front wall of said hopper and said cylindrical barrel, said worm having an upstanding spiral blade extending the length thereof, that portion of said spiral blade which traverses said hopper being peripherally beveled to a knife edge and that portion which traverses said barrel being flat and plane about the periphery, an upstanding spiral rifling having a flat face formed about the inner wall of said hollow barrel and closely fitting the flat periphery of said spiral blade, and a massive pulley wheel means joined to that end of said worm spaced from said plate to define a flywheel type rotation mechanism for said spiral blade.

2. A heavy duty grinder for preparing large chunks and blocks of frozen or partially frozen meat, fish, and the like, comprising an elongated hollow heavy duty steel casting defining the receiving hopper, feed throat and the barrel elements of a worm type grinder, and an elongated worm mounted for rotation within and extending the full length of said hollow casting through the lower portions of said hopper and throat and through said barrel, said feed throat being hollow and having a rounded converging taper in the direction of advance of said worm to restrict flow therethrough and to define a self-forcing feed arrangement intermediate said hopper and said barrel, said worm having an upstanding spiral blade extending the length thereof with at least a portion of the blade being beveled to a knife edge to effect a cutting grip upon material engaged by the blade.

3. A heavy duty grinder for preparing frozen or partially frozen fish, meat and the like prior to thawing, comprising an elongated hollow steel casting defining in one integral piece the heavy duty receiving hopper, feed throat and barrel elements of a worm type grinder, an elongated worm mounted for rotation within and extending the full length of said hollow casting through the lower portions of said hopper and throat and through said barrel, said barrel being of a hollow cylindrical configuration and closely bounding the periphery of said worm, said feed throat being hollow and having a converging taper in the direction of advance of said worm, said feed throat also being rounded on a curved sweep in a lateral direction to define a funnel shape to restrict flow therethrough, thus being self-forcing to feed material against the worm intermediate said hopper and said cylindrical barrel, said worm having an upstanding spiral blade extending the length thereof within said casting, that portion of said spiral blade which traverses said hopper being peripherally beveled to a knife edge and that portion which traverses said barrel being flat and plane about the periphery, and an upstanding spiral rifling having a flat face formed about the inner wall of said hollow barrel and closely fitting the flat periphery of said spiral blade.

4. A heavy duty grinder, comprising an elongated hollow body member defining the receiving hopper, feed throat and barrel elements of a worm type grinder in one integral piece, and an elongated feed worm journalled for rotation within said hollow body member, said worm having a spiral blade which extends through the lower portions of said hopper and throat and through said barrel, the bottom portion of said body member beneath the length of said worm being curved closely about the periphery of the spiral blade for co-operation therewith in advancing material through the grinder, said hopper having an open top bounded by vertical front and rear walls and by sloping side walls, the sloping side walls of said hopper merging in sharply converging lower side walls joined to the curved bottom portion of said body member, said feed throat being hollow and tapered in the direction of advance of said spiral blade to restrict flow therethrough and to define a converging funnel shape which is self-forcing in feed intermediate the front wall of said hopper and said barrel, the side and lower portion of said hollow throat being bounded by the sharply converging lower side walls of said hopper and the curved bottom portion of said casting, respectively, to direct material toward said spiral bladed worm.

References Cited in the file of this patent

UNITED STATES PATENTS

| 337,631 | Shaw | Mar. 9, 1886 |
| 1,264,081 | Johnston | Apr. 23, 1918 |
| 2,199,030 | Ritter et al. | Apr. 30, 1940 |
| 2,210,006 | Rieske | Aug. 6, 1940 |

FOREIGN PATENTS

| 579,527 | Germany | June 30, 1933 |